US007620914B2

(12) United States Patent
Li et al.

(10) Patent No.: US 7,620,914 B2
(45) Date of Patent: Nov. 17, 2009

(54) CLICKABLE VIDEO HYPERLINK

(75) Inventors: Yin Li, Redmond, WA (US); Jian Sun, Beijing (CN); Li Li, Kirkland, WA (US); Weiwei Zhang, Beijing (CN); Xiaoou Tang, Beijing (CN); Ying Li, Bellevue, WA (US); Michael Hurt, Redmond, WA (US); Eric Picard, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 11/419,641

(22) Filed: May 22, 2006

(65) Prior Publication Data

US 2007/0091093 A1 Apr. 26, 2007

Related U.S. Application Data

(60) Provisional application No. 60/727,023, filed on Oct. 14, 2005.

(51) Int. Cl.
*G06F 13/00* (2006.01)
*G06F 15/00* (2006.01)

(52) U.S. Cl. .................. 715/854; 715/758; 715/851

(58) Field of Classification Search ............... 715/719, 715/738, 700, 758, 763–765, 851, 840, 853–85
See application file for complete search history.

(56) References Cited

U.S. PATENT DOCUMENTS

| 5,715,416 | A | * | 2/1998 | Baker | .................. 715/839 |
| 5,809,512 | A | | 9/1998 | Kato | |
| 5,918,012 | A | | 6/1999 | Astiz et al. | |
| 6,175,840 | B1 | | 1/2001 | Chen et al. | |
| 6,570,586 | B1 | * | 5/2003 | Kamen et al. | ............ 715/719 |
| 2003/0074672 | A1 | | 4/2003 | Daniels | |
| 2006/0218618 | A1 | | 9/2006 | Lorkovic | |

OTHER PUBLICATIONS

Search Report from the International Searching Authority with the Written Opinion mailed Feb. 21, 2007. 8 pages.

* cited by examiner

*Primary Examiner*—Cao (Kevin) Nguyen
(74) *Attorney, Agent, or Firm*—Lee & Hayes, PLLC

(57) ABSTRACT

A system that provides binds or associates a clickable hyperlink with an object that appears in a video stream. The hyperlink may be sent in a separate stream from the video stream, and user interfaces are provided to a user to activate the hyperlink. Activation of the hyperlink may cause a redirection to an associated website. Furthermore, feedback may be provided as to the user's activity regarding interest and activation regarding particular hyperlinks in the video.

20 Claims, 6 Drawing Sheets

CLICKABLE VIDEO HYPERLINK

RELATED APPLICATIONS

The present application claims priority under 35 U.S.C. §119(e) to U.S. Provisional Application No. 60/727,023 filed Oct. 14, 2005, the disclosure of which is incorporated herein.

BACKGROUND

Hyperlinks are widely used in electronic text documents and typically implemented with a browser (i.e., web browser). A hyperlink may be considered as a connection between an element, such as a word, phrase, symbol or object in a document, such as a hypertext document, with a different element in the same document, another document, file or script. The hyperlink may be activated by a user clicking on the hyperlink through an interactive user device such as mouse. When the user clicks on the hyperlink, the browser may be redirected to the clement or other document. The concept of hyperlink may also be used on images, particularly as a "map" tag on images in hyper text markup language. For example, when a user clicks on a region having the map tag, the browser is redirected to the linked webpage.

The implementations described above regarding the concept of hyperlinks have been in reference to static documents. In other words, a hyperlink exists on documents that do not change. Browsers and other applications not only are supporting static electronic documents, but may also support video. Therefore, it would be desirable to implement the hyperlink concept with elements in a video or video stream. However, the implementation of hyperlinks with video may present several problems, including associating a hyperlink to a moving target object in a video frame. Furthermore, a hyperlink in video may be distractive to the viewing experience.

SUMMARY

A video stream includes a sequence of video frames, and key video frames are identified which include an object. A hyperlink is bound to the object, and a separate stream that includes the hyperlink is provided along with the video stream. The hyperlink may be activated by a user at a device that receives the video stream and hyperlink stream.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
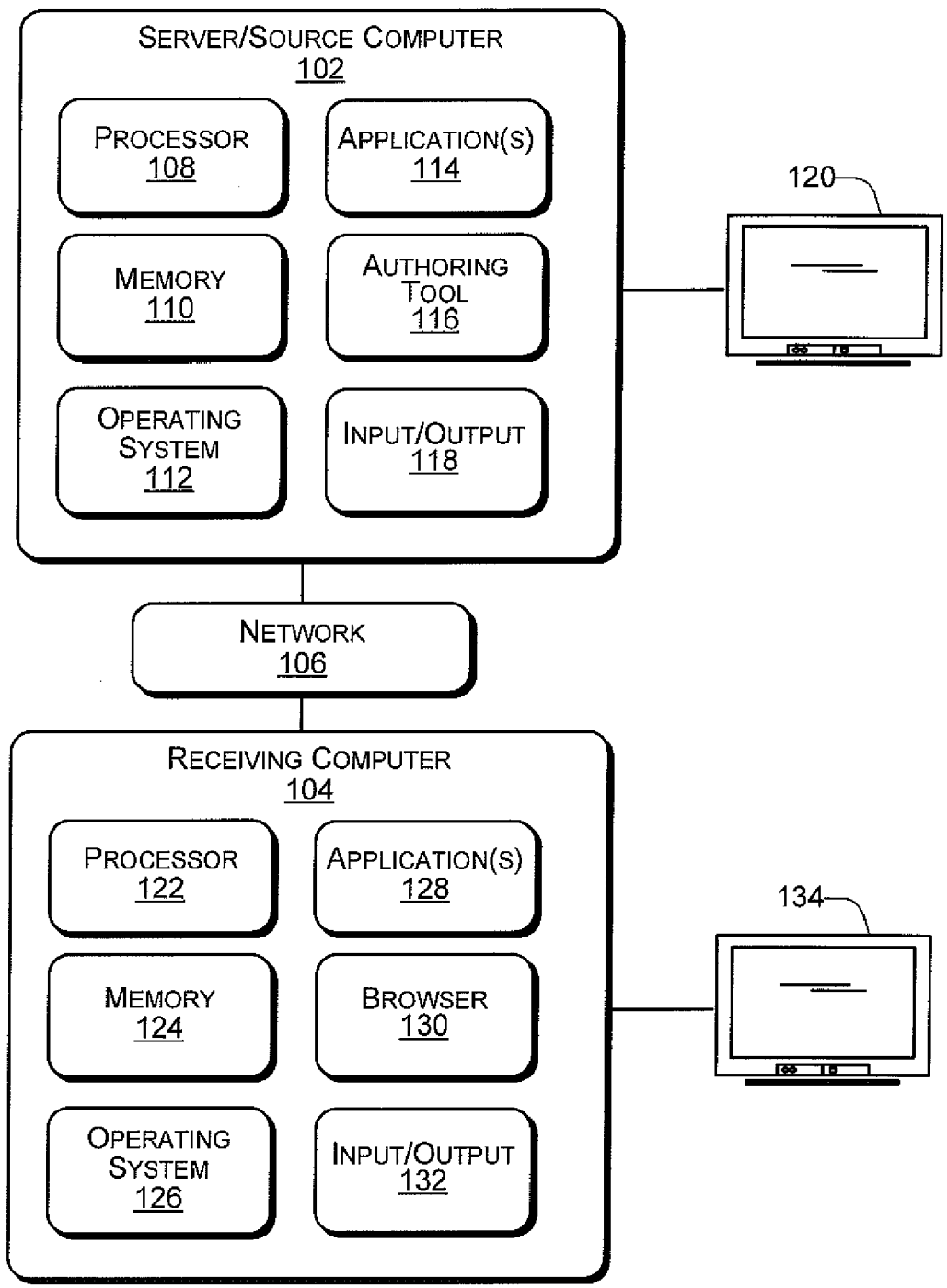
FIG. 1 is a diagram of an exemplary system for providing hyperlinks with video.

FIG. 1 shows an exemplary system 100 that provides hyperlinks with a video stream. In particular, a hyperlink is associated with an object at a server or source computer 102. The video stream, along with a created hyperlink stream, may be sent to a receiving device or computer 104 over a network 106. The network 106 may include one or more networks, including the Internet.

The server computer 102 includes one of several computers, such as a personal computer, dedicated server, or other computing device. Computer 102 includes one or more processing units or processors as represented by processor 108. The computer 102 also has a memory 110 that is accessed or controlled by processor 108. Memory 110 includes and represents storage memory, dynamic memory, read only memory, read access memory, etc. An operating system 112 is included in server computer 102, and may reside in memory 110.

Furthermore, the computer 102 includes one or more applications 114. In particular, applications 114 include applications that provide or are used to access audio and video streams. Video streams, provided in MPEG and other formats, arc particularly accessed, and an application, identified in this example as an authoring tool 116, is used to associate hyperlinks with particular objects in a video stream.

In this example, the authoring tool 116 provides a separate stream that includes hyperlinks which are associated with objects in video frames of the separate video stream. The two separate streams may be synchronized or timed with one another, and sent over the network 100. Input/output 118 is provided to send the video stream and hyperlink stream. In certain cases, a particular communication protocol (e.g., RIP) may be implemented, along with a particular transportation protocol (e.g., TCP/IP). The input/output 118 may include particular encoders, decoders, and communication interfaces (e.g., wired, wireless, etc.) that support such communication protocols, transportation protocols, and other protocols used to transport the video stream, hyperlink stream, and other data (i.e., other streams such as audio and caption streams). Input/output 118 further provides functionality to receive other data and information.

The authoring tool 116 may implement use of a display 120 that allows a user to identify an object or objects in a series of frames and associate a hyperlink to the object(s), as further discussed below. The input/output 118 may include any interfaces (e.g., analog video, digital video, etc) to display the video stream and hyperlinks on display 120.

The receiving computer 104 may be one of various computing or entertainment devices, such a personal computer, personal digital assistant, set top box (e.g., Web TV, Internet Protocol TV, etc.). Receiving computer 104 includes one or more processing units or processors as represented by processor 122. The computer 104 also has a memory 124 that is accessed or controlled by processor 122. Memory 124 includes and represents storage memory, dynamic memory, read only memory, read access memory, etc. An operating system 126 is included in receiving computer 104, and may reside in memory 124.

Furthermore, the computer 104 includes one or more applications 130. In particular, applications 130 include applications that play back received video streams and hyperlink streams that are synchronized with the video streams. A browser program or browser 130, in particular, may be used with or without other applications to play back video streams and associated hyperlink streams. The browser 130 if further implemented to allow user interaction, such as activating a hyperlink, and redirection to sites (i.e., websites) associated with particular hyperlinks.

An input/output 132 is provided to receive video streams and hyperlink streams. The input/output 132 may include particular encoders, decoders, and communication interfaces (e.g., wired, wireless, etc.) that support various communication protocols, transportation protocols, and other protocols used to receive the video stream and hyperlink stream and other data. Input/output 132 may also further provide functionality to send other data and information.

Applications 128 and browser 130 in particular, may implement use of a display 134 that displays a video stream with hyperlinks associated to particular objects in a video stream. The input/output 134 may include any interfaces (e.g., analog video, digital video, etc) to display the video stream and hyperlinks on display 134.

Figure 2:
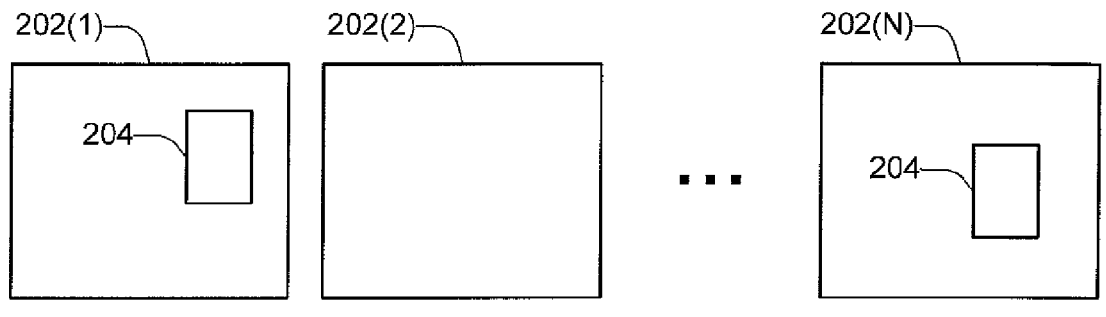
FIG. 2 is a diagram of video frames that are associated with hyperlinks.
Figure 2:

FIG. 2 shows exemplary video frames that are associated with hyperlinks. A video stream 200 includes a string or sequence of multiple and consecutive video frames 202. In typical implementations, the number of frames may be several hundreds of frames. The video stream 200 and its video frames may be formatted in one of several standards such as the standards defined by the motion pictures expert group or MPEG.

In an implementation, two key frames of frames 202 are identified. In specific, a first frame 202 and a last frame 202 are identified, where intermediate frames 202 of the video stream 200 exist between the first frame 202 and last frame 202. In this example, the frame 202(1) is identified as the first key frame and frame 202(N) is identified as the last key frame. A shape 204 is placed over an object. In this example, the object that is associated with the shape 204 in the frame is that of a "black jacket" worn by a woman. A rectangle in this example is used to identify shape 204; however, shapes other than a rectangle may be used.

The shape 204 and the object it identifies (i.e., the "black jacket") are associated with a particular hyperlink. The particularly association may be performed by authoring tool 116 described above in FIG. 1. In one implementation, the algorithms and methods described in pending U.S. patent application No. 60/727,119 filed on Oct. 14, 2005 to Zhang et al, describe how an object is associated or tracked with video and video frames. In certain cases, additional key frames that are intermediate of (i.e., between) frame 202(1) and 202(N) in video stream, may be identified for better tracking results using particular algorithms. In other words, the additional intermediate frames 202 are used to achieve better tracking results.

In this example, a particular object (i.e., the "black jacket") is identified by shape 204 and associated with a particular hyperlink; however, in other examples, multiple shapes and objects may be identified and associated with different hyperlinks. Hyperlinks may be indicated in a hypertext document through tags in a markup language such as SGMTL and HTML.

A separate hyperlink stream may be created based on the association of the shape 204. The hyperlink stream may include hypertext documents that are associated with each frame 202. In other words, there may be a hypertext document associated each frame 202. The hypertext stream may be sent separate of the video stream 200 similar to how audio or caption streams are sent with video streams. Information that is included in the hypertext stream includes the hyperlink, the shape (e.g., shape 204), uniform resource locator (URL), and location of the hyperlink on the video frame. Other information may also be provided, including descriptive information such as the name of the object and associated URL of the hyperlink.

Figure 3:
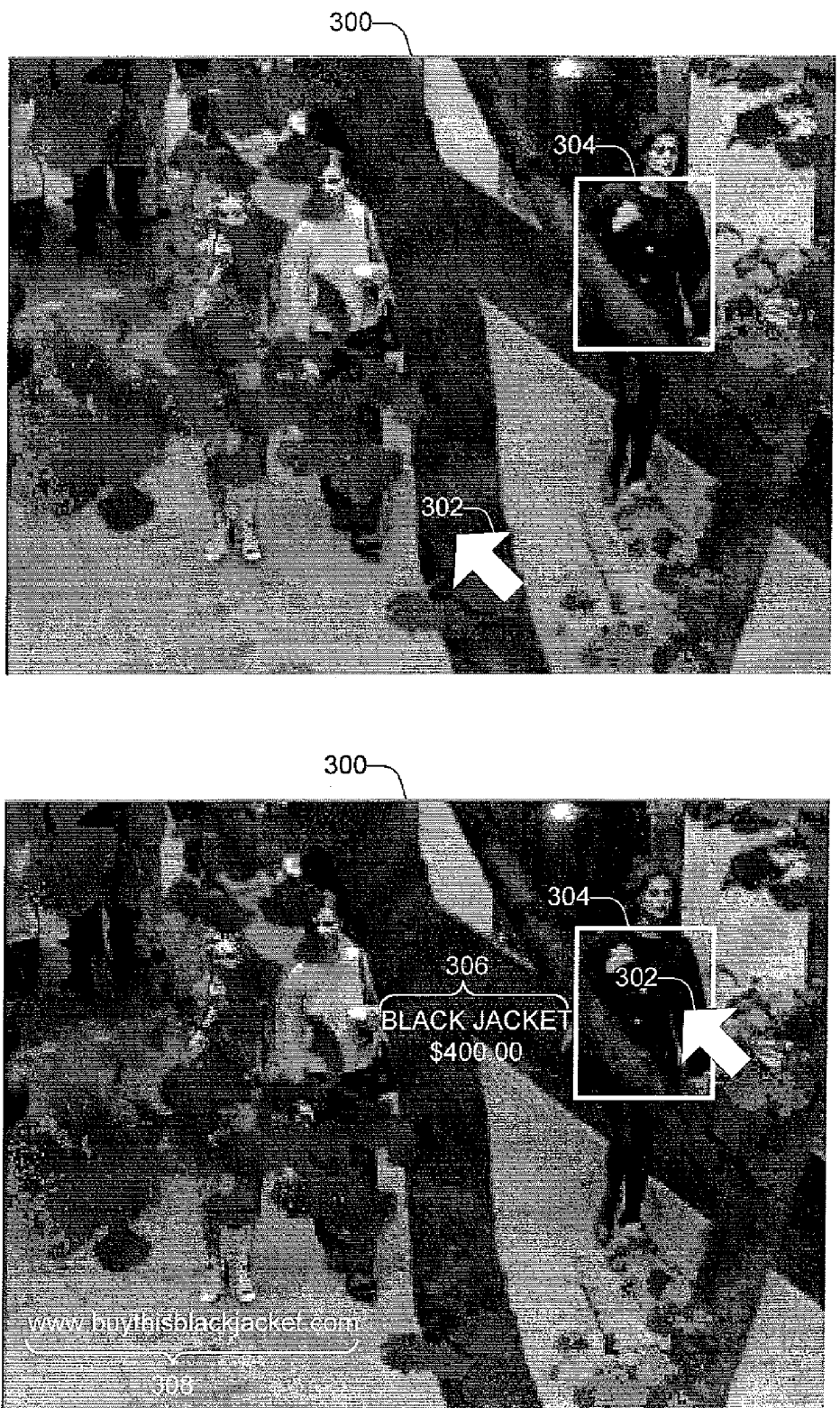
FIG. 3 is an illustration of a graphical user interface that provides a hyperlink in an object in a video stream.

FIG. 3 shows an exemplary user interface. An example screenshot 300 which may be displayed on display 134 of receiving computer 104 is shown. The screenshot 300 may be provided by an application in applications 128 and/or browser 130. In particular, a received video stream and its associated hyperlink stream are processed and displayed as shown in screenshot 300 using applications 128 and/or browser 130.

Receiving computer 104 is configured to use a pointing device (not shown), such as a mouse. Arrow 302 is representative of a user instruction conveyed to the pointing device. In the user interface as shown in screen shot 300, as the video is displayed, a user may place or hover the arrow 302 over the display (i.e., screen shot 300). As the arrow 302 is displayed, faint or light shapes such as rectangles, may appear over particular objects in the display, as represented by region or shape 304, indicating the availability or presence of hyperlinks, where the hyperlinks are associated with the objects that shapes surround. Otherwise, when arrow 302 is not activated or hovered over the display, no other shapes are presented, so that the video viewing experience is not disturbed.

The screen shot 300 or display may also provide for additional information to be presented to the user. For example, as the user places (hovers) the arrow 302 over the particular shape or hyperlink region (e.g., shape 304), information regarding the object, in this example "black jacket" 306, is presented. In addition, the URL of the hyperlink is shown to the user. In this example, the URL is "www.buythisblackjacket.com". Other information may also be conveyed. The information and associated hyperlinks as described above, are conveyed or provided through the separate hypertext stream.

Other variations of the user interface include playing the video in normal speed, until a user places the arrow 302 in the display. When the arrow 302 is placed or activated in the display the video slows down. In an implementation, the playback speed of the video may slow down as the arrow enters the hyperlink region as presented by shape 304. The slowing down of the video allows the user to activate or click on the shape 304 in order to activate the hyperlink. In other implementations, the video is paused to allow the user to activate the hyperlink. Once the hyperlink is activated or clicked, the browser 130 redirects the user to the particular website (e.g., www.buythisblackjacket.com).

Figure 4:
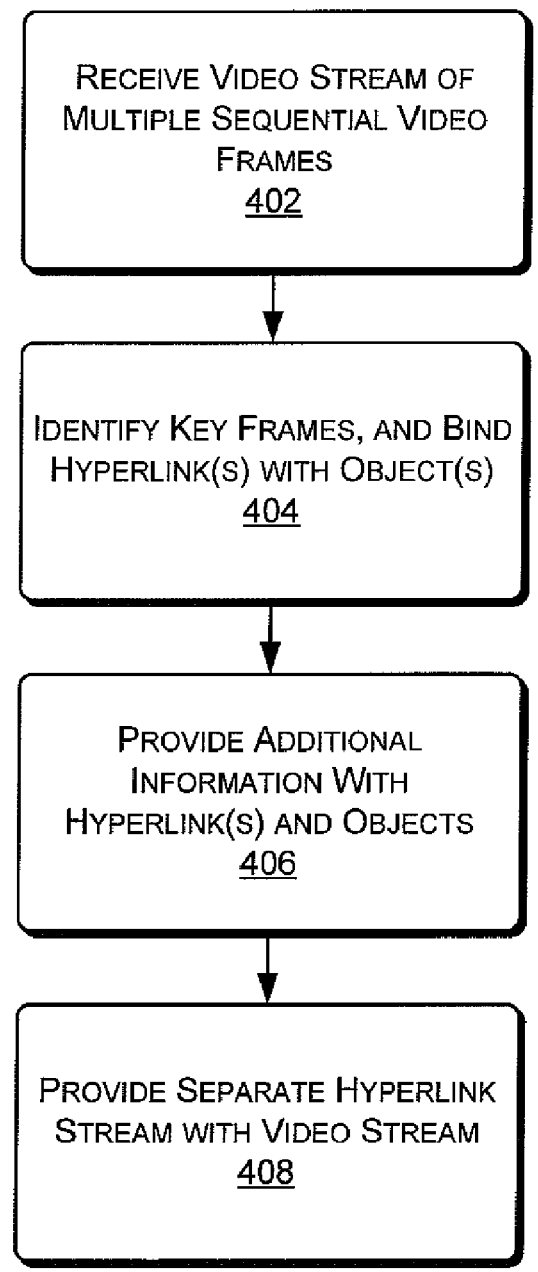
FIG. 4 is a flowchart illustrating a process for creating hyperlinks on video streams.

FIG. 4 shows a process 400 that provides for creating hyperlinks on video. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order. The process 400 may be implemented, for example, by the computer 102 of FIG. 1, although the process 400 may be implemented by other architectures.

At block 402, a video stream that may include hundreds of individual video frames is received. The video frames follow one another in a sequence in the video stream. The video stream may be provided as one of several formats including MPEG standards. The video stream may be processed from another computing device or storage device that may or may not be resident on the computing device that performs the process 400. Particular objects are included in the video frames of the video stream. Such objects may be associated with a hyperlink.

At block 404, key frames are identified in the video stream. In particular, a first and a last key frame are identified. Additional key frames may be identified, depending on the need for further accuracy and/or the particular algorithm used to bind or associate an object in a video stream with a hyperlink. A shape is used to identify or bind the particular object present in the key frames. The shape is representative of and associated with a hyperlink, therefore the hyperlink becomes associated with the object.

At block 406, additional information may be added with the hyperlink and the object. Examples of additional information include, but are not limited to, the associated URL of the hyperlink, the location of the hyperlink on the video frame, the shape of the hyperlink, text further describing the hyperlink to the user, etc.

At block 408, a separate stream that includes the hyperlink is provided. This hyperlink stream may include a sequence of hypertext documents that include hyperlinks and information associated with the hyperlinks. The hyperlink may be communicated similar to audio and caption streams, along with the video stream. The hyperlink stream is particularly sequenced or timed with the video stream, such that hyperlinks and associated information are properly displayed to a user of a receiving device or computer that receives the streams. Furthermore, the streams may be encoded to support particular communication and transport protocols and formats.

Figure 5:
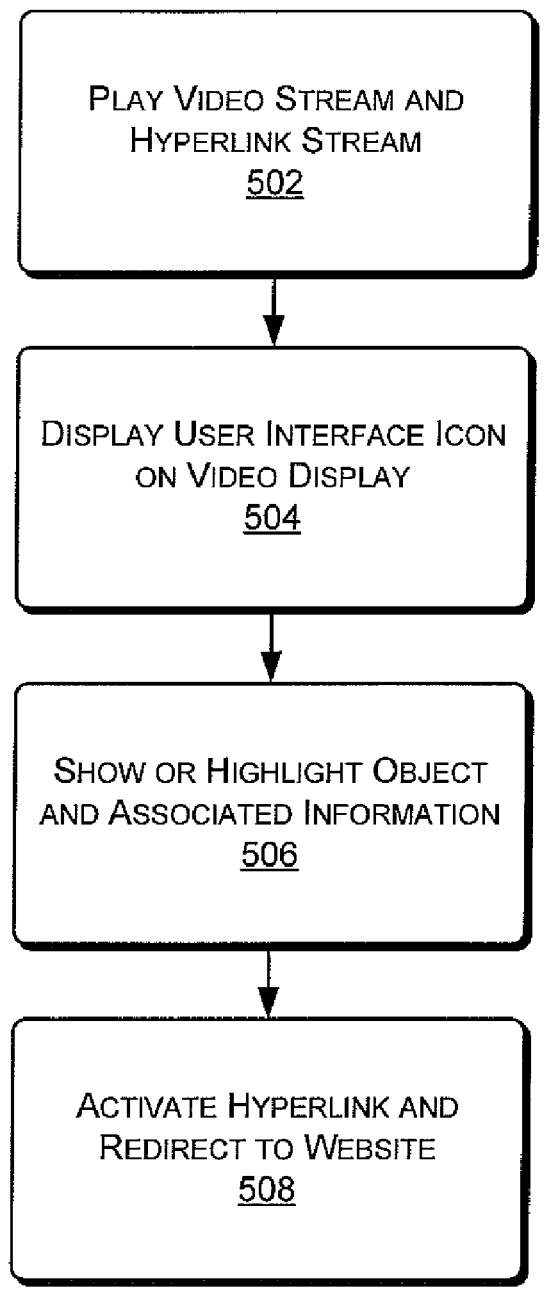
FIG. 5 is a flowchart illustrating a process for activating a hyperlink in a video.

FIG. 5 shows a process 500 that provides for activating a hyperlink in video. The process 500 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order. The process 500 may be implemented, for example, by the computer 104 of FIG. 1, although the process 500 may be implemented by other architectures.

At block 502, a video stream is played by an application and displayed to a user through a display device such as display 134. Along with the video stream a hyperlink stream that is synchronized with the video stream is played or processed. The processed hyperlink stream can run in the background and may not be evident to (i.e., hyperlinks may not be seen by) the user. Additional streams that are synchronized with the video stream may also be played or processed, including audio and captions streams.

At block 504, a cursor or interface icon is displayed. The interface icon may be an arrow that represents the actions of a pointing device such as a mouse. The interface icon is particularly displayed on top of the video when a user activates the pointing device, allowing the user to hover the interface icon over the display.

At block 506, as the user hovers the interface icon over regions of the video display that are associated with a hyperlink, the regions may be represented by a shape such as a rectangle. The region and the shape in particular, may be highlighted and presented to the user (e.g., the rectangle is outlined and shown to on the display). As the interface icon enters the region or shape, the video may be slowed or paused, allowing the user to place the interface icon over the region. Other information may also be presented or displayed, including the name of the URL, and information describing the object.

At block 508, the hyperlink is activated by the user by clicking on the region. A browser may redirect the user to a website identified and associated with the URL of the hyperlink when the hyperlink is activated.

Figure 6:
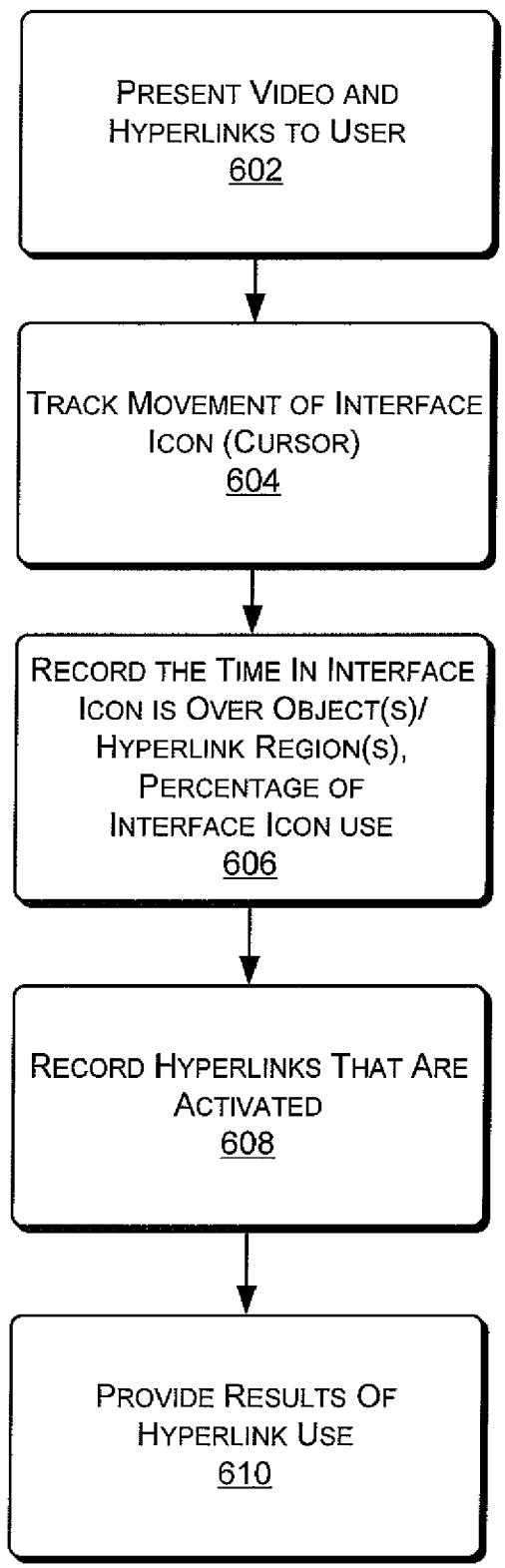
FIG. 6 is a flowchart illustrating a process for providing feedback as to user behavior as to hyperlinks in a video.

FIG. 6 shows a process 600 that provides for feedback as to user behavior regarding hyperlinks in a video. The process 600 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order. The process 600 may be implemented, for example, by the system 100, and particular at the computer 104, of FIG. 1, although the process 600 may be implemented by other architectures.

At block 602, video along with hyperlink information is presented or displayed to a user. A hyperlink associated with an object is represented by a highlighted region on the video. The video and hyperlinks (i.e., highlighted region) associated with objects in the video are displayed on a screen such as display 134. Furthermore, a cursor or an interface icon is displayed with the video and hyperlink regions, where the interface icon represents a user's interaction with a pointing device such as a mouse.

At block 604, the movement of the interface icon is tracked. In particular, an inference is drawn between the movement of the user interface icon and the interest (usage) of a user as to the hyperlinks in the video.

At block 606, the time the interface icon hovers or is placed over a particular object or hyperlink region is recorded. Furthermore, percentage of the time the interface icon is moved over particular objects or hyperlink regions may be recorded, where percentage of time is over the time the interface icon is active.

At block 608, if a user activates a hyperlink and is directed to website, the hyperlinks that are activated are recorded. Furthermore, the number of times a particular hyperlink is activated may be recorded.

At block 610, the results derived from blocks 604, 606, and 608 may be provided or sent to another party, such as server computer from which the video originated, or a third party gathering such information.

CONCLUSION

The above described system and methods support associating hyperlinks with objects in video, providing users video with the hyperlinks which may be activated. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method performed by a first computing device having a processor for executing instructions stored in a memory, the method comprising:

receiving a video stream by an authoring tool implemented by the processor on the first computing device, the video stream including a sequence of multiple consecutive video frames, the video stream being formatted in a format conforming to a standard video format, wherein the authoring tool is configured to implement a hyperlink for association with a specified object visible in the sequence of multiple consecutive video frames when the sequence of multiple consecutive video frames in the video stream is displayed on a display device, the hyperlink to be selectable when the sequence of multiple consecutive video frames including the specified object is displayed on the display device;

identifying key frames of the sequence of multiple consecutive video frames in the video stream by the authoring tool implemented by the processor on the first computing device by identifying a first frame and a last frame in the sequence of multiple consecutive video frames in the video stream, the sequence of multiple consecutive video frames in the video stream including a plurality of intermediate frames existing between the identified first frame and the identified last frame;

binding the hyperlink directly to the specified object in each of the key frames by associating a shape to be displayed over the specified object in the sequence of multiple consecutive video frames in the video stream when the sequence of multiple consecutive video frames is displayed on the display device, wherein the hyperlink is associated with the shape to bind the hyperlink to the specified object in the sequence of multiple consecutive video frames, wherein the hyperlink represents a connection between the specified object and a website accessible via the World Wide Web having information corresponding to the specified object, wherein the hyperlink is configured to be activated in an application displaying the video stream to direct the application to present the website having information corresponding to the specified object;

providing a separate hyperlink stream that includes the hyperlink and the shape to be displayed in the video stream over the specified object for transmitting the separate hyperlink stream with the video stream comprising the with the sequence of multiple consecutive video frames, wherein the hyperlink stream and the video stream are transmitted by a communication interface of the first computing device for transmission over a network using a communication protocol for receipt by a second computing device, wherein, when the video stream is displayed by the application at the second computing device, the shape is configured to become visible over the object in the displayed video stream in response to placement of a cursor icon of a pointing device onto a video display of the sequence of multiple consecutive video frames in the video stream during display of the video stream by the application at the second computing device; and receiving feedback information at the first computing device on user behavior regarding the hyperlink associated with the specified object in the sequence of multiple consecutive video frames in the video stream, wherein the feedback is received from the second computing device following display of the sequence of multiple consecutive video frames in the video stream at the second computing device, wherein the feedback information includes whether a user at the second computing device activated the hyperlink associated with the specified object.

2. The method as recited in claim 1, wherein the feedback information further includes an amount of time that the cursor icon of the pointing device is located over the shape displayed in association with the hyperlink.

3. The method as recited in claim 1, wherein, when the user of the second computing device locates the cursor icon of the pointing device over the shape displayed on the video display, the video display of the video stream is slowed or paused.

4. The method as recited in claim 1,
wherein textual information describing the object is included with the hyperlink stream transmitted by the first computing device,
wherein, when the shape is displayed over the object in the displayed video stream on the video display at the second computing device in response to the user of the second computing device placing the cursor icon of the pointing device onto the video display, the textual information describing the object is also displayed on the video display displaying the video stream.

5. The method as recited in claim 1,
wherein the application for displaying the video stream is a web browser located at the second computing device,
wherein when the hyperlink is activated, the web browser is directed to a corresponding website.

6. The method as recited in claim 1 further comprising adding additional information with the hyperlink that is sent along with the separate stream, wherein the additional information includes URL information, location of the hyperlink on the video frames, and text further describing the object.

7. The method as recited in claim 1, wherein the feedback information includes an amount of time that the cursor icon of the pointing device is located over the shape displayed in association with the hyperlink as a percentage of a total amount of time that the cursor icon is active during display of the sequence of multiple consecutive video frames in the video stream.

8. A computing device comprising:
a processor;
a communication interface in communication with a network, the communication interface being operable by the processor for receiving communications including a video sequence via a communication protocol, wherein the video sequence comprises multiple consecutive video frames including a first frame, a last frame, and a plurality of intermediate frames existing between the first frame and the last frame, the communications received by the communication interface further including hyperlink information associated with at least some of the frames of the video sequence;
a memory in communication with the processor for storing the communications received by the communication interface, the storage media further including processor-executable instructions for implementing an application, the application being implemented by the processor to display the video sequence on a display device in communication with the computing device;
wherein, when a user places a cursor icon of a pointing device onto a display of the video sequence during display of the video sequence by the application on the display device, the cursor icon of the pointing device is displayed over top of the frames of the video sequence displayed by the application on the display device;
wherein, when the user places the cursor icon of the pointing device onto the display of the video sequence during display of the video sequence by the application, a shape associated with an available hyperlink becomes visible and is displayed over top of the frames of the video sequence displayed by the application on the display device, wherein the shape is displayed over and associated with a corresponding object visible in the video sequence, wherein the hyperlink is bound to the corresponding object in the video sequence through the displayed shape; and wherein the hyperlink associated with the shape is activated when the user uses the cursor icon of the pointing device to select the shape associated with the hyperlink.

9. The computing device of claim 8, wherein the video sequence is received by the communication interface as video stream received in a standard video protocol, and the hyperlink information is received by the communication interface in a communication stream that is separate from the video stream and synchronized with the video stream.

10. The computing device of claim 8, wherein, when the cursor icon of the pointing device is moved over the shape associated with the hyperlink, textual information regarding the object in the video sequence with which is shape is associated is displayed on the display device overlaid on top of the frames of the video sequence displayed by the application on the display device.

11. The computing device of claim 8, when the cursor icon of the pointing device is moved over the shape associated with the hyperlink, the display of the frames of the video sequence is slowed down or stopped.

12. The computing device of claim 8, wherein the shape surrounds the object in the video sequence with which the hyperlink is associated.

13. The computing device of claim 8, wherein the application is a web browser, and wherein activating the hyperlink causes the web browser to direct the user to a website associated with the hyperlink.

14. The computing device of claim 8, wherein the application records as an event that the hyperlink was activated by the user and sends information regarding the event as feedback to another computing device over the network via the communication interface.

15. A method performed by a computing device having a processor executing instructions stored in a memory, the method comprising:

displaying a video sequence to a user on a display device in communication with the computing device, the video sequence comprising multiple consecutive video frames including a first frame, a last frame, and a plurality of intermediate frames existing between the first frame and the last frame, the video sequence further including hyperlink information associated with at least some of the frames of the video sequence;

presenting a shape displayed over the an object highlighted regions in a display of the video sequence on the display device, wherein the shape represents a hyperlinks that is bound to the objects in the video sequence;

when a user places an interface icon of a pointing device onto the display of the video sequence during display of the video sequence on the display device, displaying the interface icon of the pointing device over top of the frames of the video sequence displayed on the display device;

tracking movement of the interface icon of the pointing device as the interface icon is moved over the shape displayed over the object in association with the hyperlink;

recording an amount of time that the interface icon of the pointing device is located on the shape displayed in association with the hyperlink; and sending information regarding the amount of time that the interface icon of the pointing device is located on the shape displayed in association with the hyperlink as feedback information to another computing device over a network.

16. The method of claim 15, wherein the presenting the shape displayed over the object in the display of the video sequence on the display device, does not occur until the interface icon of the pointing device is located on the display of the video sequence on the display device.

17. The method of claim 16, wherein the shape displayed over the object fades to become transparent when the interface icon of the pointing device is no longer located on the display of the video sequence on the display device.

18. The method of claim 15, wherein the recording includes recording a percentage of time that the interface icon of the pointing device is located over the shape displayed over the object compared with a total amount of time that the interface icon of the pointing device is made active on the display of the video sequence on the display device, and sending information regarding the percentage of time and total time to the other computing device over the network.

19. The method of claim 15, further comprising:

tracking a number of times that the hyperlink is activated by the user; and sending information regarding the number of times that the hyperlink is activated to another computing device over a network.

20. The method of claim 19, further comprising slowing or pausing the display of the frames of the video sequence when the interface icon of the pointing device is moved over the shape associated with the hyperlink.

* * * * *